(12) United States Patent
Huang et al.

(10) Patent No.: US 11,981,087 B2
(45) Date of Patent: May 14, 2024

(54) THREE-DIMENSIONAL (3D) PRINTED OBJECTS WITH FRACTURE CHANNELS

(71) Applicant: Hewlett-Packard Development Company, L.P., Spring, TX (US)

(72) Inventors: Wei Huang, Palo Alto, CA (US); Gary J Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/774,803

(22) PCT Filed: Dec. 10, 2019

(86) PCT No.: PCT/US2019/065409
§ 371 (c)(1),
(2) Date: May 5, 2022

(87) PCT Pub. No.: WO2021/118535
PCT Pub. Date: Jun. 17, 2021

(65) Prior Publication Data
US 2022/0388248 A1  Dec. 8, 2022

(51) Int. Cl.
*B29C 64/393* (2017.01)
*B22F 5/00* (2006.01)
(Continued)

(52) U.S. Cl.
CPC ............ *B29C 64/393* (2017.08); *B22F 5/003* (2013.01); *B22F 10/20* (2021.01); *B22F 10/85* (2021.01);
(Continued)

(58) Field of Classification Search
CPC ..... B29C 64/393; B29C 64/141; B22F 10/20; B22F 10/85; B22F 5/003
See application file for complete search history.

(56) References Cited

U.S. PATENT DOCUMENTS 7,976,360 B2   7/2011  Jaunzemis et al.
10,286,602 B1  5/2019  Linnell et al.
(Continued)

FOREIGN PATENT DOCUMENTS

CN   108025499 A   5/2018
CN   108290348 A   7/2018
(Continued)

OTHER PUBLICATIONS

Hart, Engineering Fracture Mechanics, Fracture behavior of additively manufactured acrylonitrile butadiene styrene (ABS) materials (Year: 2017).*

(Continued)

*Primary Examiner* — Alison L Hindenlang
*Assistant Examiner* — Erica Hartsell Funk
(74) *Attorney, Agent, or Firm* — Shook, Hardy & Bacon L.L.P.

(57) ABSTRACT

In one example in accordance with the present disclosure, a system is described. The system includes a fracture channel controller to determine fracture channels for a three-dimensional (3D) printed object. Portions of the 3D printed object along fracture channels are to be solidified to a lesser degree as compared to non-channel portions of the 3D printed object. The system also includes an additive manufacturing controller to control an additive manufacturing device. The additive manufacturing controller controls the additive manufacturing device to 1) solidify portions of a layer of powdered build material to form a slice of the 3D printed object and 2) selectively solidify fracture channels in the slice, wherein the fracture channels are solidified to a lesser degree as compared to non-channel portions.

20 Claims, 8 Drawing Sheets

(51) Int. Cl.
*B22F 10/20* (2021.01)
*B22F 10/85* (2021.01)
*B29C 64/141* (2017.01)
*B33Y 10/00* (2015.01)
*B33Y 50/02* (2015.01)

(52) U.S. Cl.
CPC ............ *B29C 64/141* (2017.08); *B33Y 10/00* (2014.12); *B33Y 50/02* (2014.12)

(56) References Cited

U.S. PATENT DOCUMENTS

| | | |
|---|---|---|
| 2013/0001237 A1 | 1/2013 | Marsh |
| 2014/0086780 A1 | 3/2014 | Miller et al. |
| 2015/0042017 A1 | 2/2015 | Ramaswamy et al. |
| 2015/0370958 A1 | 12/2015 | Arisoy et al. |
| 2018/0050486 A1 | 2/2018 | Talgorn et al. |
| 2019/0001576 A1 | 1/2019 | Eller et al. |
| 2019/0062222 A1 | 2/2019 | Pegna et al. |
| 2019/0126560 A1 | 5/2019 | Garcia et al. |
| 2019/0176390 A1* | 6/2019 | White .................. B29C 64/165 |
| 2019/0240658 A1 | 8/2019 | Rajaraman et al. |

FOREIGN PATENT DOCUMENTS

| | | |
|---|---|---|
| CN | 109070463 A | 12/2018 |
| RU | 2705821 C1 | 11/2019 |
| TW | 201505820 A | 2/2015 |
| WO | 2018/017096 A1 | 1/2018 |
| WO | 2019/168516 A1 | 9/2019 |
| WO | 2019/212517 A1 | 11/2019 |

OTHER PUBLICATIONS

Song, P., Printing 3D Objects with Interlocking Parts (Year: 2015).*

* cited by examiner

THREE-DIMENSIONAL (3D) PRINTED OBJECTS WITH FRACTURE CHANNELS

BACKGROUND

Additive manufacturing systems produce three-dimensional (3D) objects by building up layers of material. Some additive manufacturing systems are referred to as "3D printing devices" because they use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of a build material. Additive manufacturing systems make objects based on data in a 3D model of the object generated, for example, with a computer-aided drafting (CAD) computer program product. The model data is processed into slices, each slice defining portions of a layer of build material that is to be solidified.

As with all manufactured items, 3D printed objects can break. For example, sufficient force may cause the 3D printed object to shatter. In some examples, the shattered fragments may have sharp corners that may prove harmful to a particular individual. For example, 3D printed objects may be placed in protective wear such as helmets or gloves. If upon fracture, the fragments have sharp corners, an individual may be injured by the sharp fragments.

Accordingly, the present specification describes systems and methods of avoiding sharp corners of 3D printed object fragments by forming predetermined fracture patterns in the 3D printed object. The portion of the 3D printed object that forms the fracture channels in the fracture pattern may be under-solidified, as compared to other portions of the 3D printed object. In some examples, the non-channel portions of the 3D printed object may be fully-fused or partially-fused themselves with the fracture channels being fused to a lesser degree. That is, the degree of solidification in additive manufacturing processes affects the resulting material properties, such as Young's modulus, ultimate strain, and stress. Therefore, under-solidified polymer powder may present different material properties as compared to fully-solidified polymer powder.

The present specification describes forming intentionally under-solidified areas to create predetermined breakage patterns in a 3D printed object. The fracture patterns may be generated in any number of ways including by using a lower density of fusing agent, a higher density of cooling agent, or by relying on thermal bleed from fully-solidified regions. Accordingly, during the printing process, portions of the 3D printed object that form the fracture channels are under-solidified so that they have a lower fracture toughness than the fully-solidified portions. Accordingly, any rupture will be along these fracture channels. The channels may be made curved, such that the additional danger resulting from sharp shards of 3D printed material is reduced.

In other words, the geometry of the structure, the densities of fusing and cooling agents, the printing process parameters, and the build orientation can be adjusted so that the fracture channels are weak enough to guide the cracks but also strong enough to provide structural support for the part.

While particular reference is made to fracture patterns to prevent sharp corners of shards of solidified powdered build material, fracture channels may be formed for a variety of reason. For example, in some cases, fracture channels produce a location where a failure of a product is more likely to occur. Accordingly, a manufacturer may form under-solidified portions of the 3D printed object to promote failure in specific desired locations, such as areas that pose less risk to users, and potentially increasing the overall fracture strength of the part by directing cracks that develop along predetermined routes, i.e., the fracture channels.

In yet another example, the fracture channels may be used to prevent object breaking. That is, fracture channels may interlock non-channel portions of the object such that even if sufficient force is present to crack the 3D printed object, the pieces, due to the geometry of the fracture channel, do not break but are retained together.

The fracture channels may be formed using any variety of additive manufacturing devices. That is, an additive manufacturing device refers broadly to any device that generates a 3D printed object. A few examples of different additive manufacturing devices that may be implemented with the above-described system which generates fracture patterns are now presented.

In one example, to form the 3D printed object, a build material, which may be powder, is deposited on a bed. A fusing agent is then dispensed onto portions of the layer of build material that are to be fused to form a layer of the 3D printed object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, laser light, or other suitable electromagnetic radiation. Due to the increased heat absorption properties imparted by the fusing agent, those portions of the build material that have the fusing agent disposed thereon heat to a temperature greater than the fusing temperature for the build material. By comparison, the applied heat is not so great so as to increase the heat of the portions of the build material that are free of the agent to this fusing temperature. This process is repeated in a layer-wise fashion to generate a 3D object. The unfused portions of material can then be separated from the fused portions, and the unfused portions recycled for subsequent 3D formation operations.

Another way to form 3D printed objects is to selectively apply binder to areas of loose build material. In this example, a "latent" part is prepared inside a build bed filled with build material. The build bed may be transferred to a furnace where a first heating operation removes solvents present in the applied binder. As solvents are removed, the remaining binder hardens and glues together build material to convert the "latent" part into a "green" part. The green part is then removed from the bed. As a result of this operation, residual build material may be caked onto the green parts. It may be desirable to remove residual build material from green parts in a cleaning operation. In some examples, the green parts are loaded into a sintering furnace where applied heat can cause binder decomposition and causes the build material powder particles to sinter or fuse together into a durable solid form.

In yet another example, a laser, or other power source is selectively aimed at a powder build material, or a layer of a powder build material, to form a slice of a 3D printed object. Such a process may be referred to as selective laser sintering.

In one particular example of additive manufacturing referred to as laser fusion, an array of lasers scans each layer of powdered build material to form a slice of a 3D printed object. In this example, each laser beam is turned on and off dynamically during the scanning process according to the image slice. Similar to a fusing agent-based system, this laser fusion process is also layer-by-layer.

In yet another example, the additive manufacturing process may use selective laser melting where portions of the powder material, which may be metallic, are selectively melted together to form a slice of a 3D printed object.

As yet another example, in fused deposition modeling melted build material is selectively deposited in a layer where it cools. As it cools it fuses together and adheres to a previous layer. This process is repeated to construct a 3D printed object.

In yet another example, the additive manufacturing process may involve using a light source to cure a liquid resin into a hard substance. Such an operation may be referred to as stereolithography. Accordingly, a device which carries out any of these additive manufacturing processes may be referred to as an additive manufacturing device and in some cases a printer.

Returning to the present system. The present system may include a fracture channel controller to determine fracture channels for a 3D printed object. Portions of the 3D printed object along fracture channels are to be solidified to a lesser degree as compared to non-channel portions of the 3D printed object. The system also includes an additive manufacturing controller to control an additive manufacturing device, of whatever type it may be. Specifically, the additive manufacturing controller controls the additive manufacturing device to 1) solidify portions of a layer of powdered build material to form a slice of the 3D printed object and 2) selectively solidify fracture channels in the slice, wherein the fracture channels are solidified to a lesser degree as compared to non-channel portions.

The present specification also describes a method. According to the method, a fracture pattern to be formed on a 3D printed object is determined. Then, in a layer-wise fashion, slices of the 3D printed object are formed by 1) depositing a layer of powdered build material, 2) solidifying powdered build material along fracture channels of the fracture pattern to a first degree, and 3) solidifying powdered build material at non-channel portions of the slice to a second degree, the second degree being greater than the first.

The present specification also describes a non-transitory machine-readable storage medium encoded with instructions executable by a processor. The machine-readable storage medium comprising instructions that determine a fracture pattern to be formed on a 3D printed object and determine a fracture strength for each fracture channel. Instructions also alter a manufacturing file associated with the 3D printed object to incorporate the fracture pattern into the 3D printed object. The instructions also, in a layer-wise fashion, form slices of the 3D printed object by 1) depositing a layer of powdered build material, 2) solidifying powdered build material along fracture channels of the fracture pattern to a first degree, and 3) solidifying powdered build material at non-channel portions of the slice to a second degree, the second degree being greater than the first degree.

Such systems and methods 1) provide for the selection of desired fracture channels such that upon failure, the 3D printed object fails in a predictable way; 2) allow formation of the fracture pattern without a second material; and 3) provides for fracture channels in an effective and simple manner. However, it is contemplated that the systems and methods disclosed herein may address other matters and deficiencies in a number of technical areas.

As used in the present specification and in the appended claims, the term "controller" may refer to an electronic component which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller cause the controller to implement at least the functionality of defining fracture patterns within a 3D printed object as described below.

Further, as used in the present specification and in the appended claims, the term "interlock" indicates that a particular fracture channel holds two adjacent portions together. For example, as depicted in FIG. 5B, a fracture along the fracture channel allows the adjacent non-channel portions to separate from one another. However, in the case that the interlocking fracture channel depicted in FIG. 5B were to fracture, the adjacent non-channel portions would not separate due to the geometry, the interlocking nature, of the fracture channel.

Further, as used in the present specification and in the appended claims, the term "under-fused" refers to a degree of fusion of a fracture channel as compared to non-channel portions of a 3D printed object. That is, the powdered build material that forms the fracture channels may be less fused than other non-channel portions, thus resulting in a reduced strength along the fracture channels.

Figure 1:
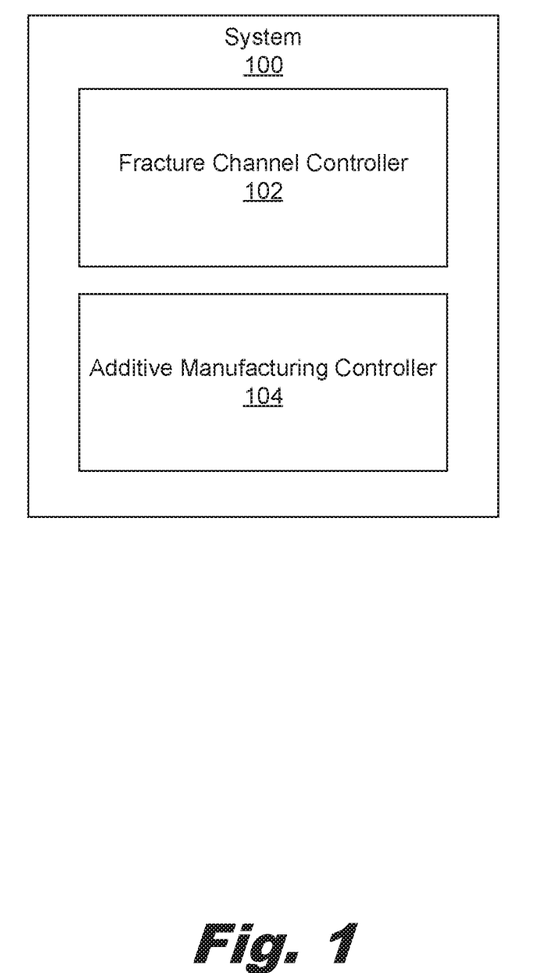
FIG. 1 is a block diagram of a control system for forming fracture channels in a 3D printed object, according to an example of the principles described herein.

Turning now to the figures, FIG. 1 is a block diagram of a control system (100) for forming embedded fracture channels in a 3D printed object, according to an example of the principles described herein. As described above, a 3D printed object may be formed by selectively hardening powdered build material in particular patterns. In some examples, this may be done in a layer-wise fashion, wherein individual slices of a 3D printed object are formed. This process is repeated layer-by-layer until the 3D printed object is formed. In general, apparatuses for generating three-dimensional objects may be referred to as additive manufacturing devices. The system (100) described herein may be implemented on a computing device that is coupled to the additive manufacturing device, where such an additive manufacturing device is a fusing-agent based system, a system where a "green" part is passed to a sintering device to sinter particles together, a selective laser sintering device, a selective laser melting device, a fused deposition modelling device, and a stereolithographic device.

The system (100) includes a fracture channel controller (102) to determine fracture channels for the 3D printed object. That is, the fracture channels may be interconnected paths of build material that are solidified to a lesser degree as compared to non-channel portions of the 3D printed object. That is, the portions of the 3D printed object along the fracture channels are solidified to a lesser degree as compared to non-channel portions of the 3D printed object. The form of these fracture channels may be based on any number of criteria. For example, the channels may be curved such that upon fracture, the shards of the 3D printed object do not include sharp corners that could potentially cause injury to a user. In another examples, the fracture channels may be placed in certain locations so that failure occurs in a deterministic location, rather than at a random place on the 3D printed object. Accordingly, the fracture channels may be formed to direct failure to a particular desired location, thereby increasing the overall object toughness.

In some examples, the fracture channel controller (102) determines the location of the fracture channels on the 3D printed object and also determines a desired fracture strength. That is, it may be desirable that failure occurs along the fracture channels before other portions of the 3D printed object, but that the fracture channels are still strong enough to hold together when a force upon the 3D printed object is less than a predetermined amount. This fracture strength may be used by the additive manufacturing controller (104), which alters solidifying characteristics to achieve the desired fracture strength.

In determining the fracture channels, the fracture channel controller (102) may alter a manufacturing file associated with the 3D printed object. For example, a design file may exist for the 3D printed object, which design file indicates materials, sizes, shapes, and other properties of the 3D printed object. In this example, the fracture channel controller (102) alters the design file associated with the 3D printed object to define the fracture channels.

Another example of a manufacturing file that may be altered is a build file. The build file includes information used to control the additive manufacturing device components. For example, the build file may include power specifications to be used to form a 3D printed object and may also indicate quantities and densities of different agents used to form the 3D printed object. In this example, the fracture channel controller (102) may alter this build file associated with the 3D printed object to define the fracture channels. Additional examples of additive manufacturing characteristics that may be adjusted to alter the degree of solidification are presented below.

Accordingly, the fracture channel controller (102) represents a component of the system (100) that either automatically, or via user input, determines locations on the 3D printed object that are to be under-solidified for any variety of reasons. Examples of the reason a particular location may be targeted for under-solidifying includes to avoid sharp corners upon cracking of the 3D printed object, to provide a predictable location of failure of the 3D printed object, and to increase a strength of the 3D printed object.

The system (100) also includes an additive manufacturing controller (104) to control an additive manufacturing device. That is, the controller (104) instructs the additive manufacturing device, and each of its constituent components, to form the 3D printed object. Specifically, in a fusing agent-based system, the controller (104) may direct a build material distributor to add a layer of build material. Further, the controller (104) may send instructions to direct the printhead to selectively deposit a fusing agent onto the surface of a layer of the build material. The controller (104) may also direct the printhead to eject the agent at specific locations to form a 3D printed object slice.

In particular, the additive manufacturing controller (104) instructs the additive manufacturing device, in whatever form, to solidify portions of a layer of powdered build material that is to form a slice of the 3D printed object and also to solidify fracture channels in the slice. However, the solidification of the fracture channels is to a lesser degree as compared to non-channel portions in part due the fracture channel definition by the fracture channel controller (102).

As described above, there are any number of ways to adjust the degree of solidification of the powdered material that is to form the fracture channels. One such example is by adjusting a width of the fracture channels. For example, thermal bleed occurs when areas that have recently been solidified, and therefore have a higher thermal energy, leak that thermal energy to adjacent areas that have not been solidified. For example, thermal bleed may occur at the boundaries of a slice of a 3D printed object. In some cases, the thermal bleed may be sufficient to cause the free powdered build material to semi-permanently solidify, or to solidify to a lesser degree. This region may still be solidified to a certain strength, but perhaps less so than the adjacent fully-solidified portions. Accordingly, in this example the fracture channels may be formed of unsolidified powdered build material, and the effects of thermal bleed may allow these unsolidified fracture channels to semi-permanently solidify. Accordingly, by changing a width of these fracture channels, the degree of semi-permanent solidification may be altered, which alteration effects the overall fracture strength along that fracture channel.

In another example, a density of a fusing agent in a fracture channel may be adjusted, and specifically reduced. That is, as described above, the fusing agent increases the absorption characteristics of the underlying powdered build material. Accordingly, by reducing the amount of fusing agent, the underlying powdered build material absorbs thermal energy to a lesser extent and thus has a lower resulting strength.

As yet another example, a density of detailing agent in a fracture channel may be adjusted, and specifically increased. As used in the present specification, a detailing agent may refer to any agent that inhibits fusing via any mechanism. For example, a detailing agent may cool, or reduce the absorption characteristics of the underlying powdered build material. Accordingly, by putting different amounts, or densities, of detailing agent on the fracture channels, the underlying powdered build material that is to form these fracture channels will be less-fused than portions of the 3D printed object that receive a lesser amount of the detailing agent.

In yet another example, an additional material may be added to the fracture channels. For example, a plasticizer may be added to the fracture channel portion of the slice to reduce its fracture toughness.

In yet another example, the emitting energy of a solidifying device may be adjusted. For example, in cases where lasers are used to solidify the powdered build material, the energy emitted by those lasers may affect to what extent the underlying build material is solidified. Accordingly, by altering those emitting characteristics, the resulting fracture toughness can be selected. Accordingly, the emitting characteristics may be altered so that the powdered build material in the fracture channels has a lower fracture toughness as compared to non-channel portions of the 3D printed object.

In yet another example, a build orientation of a part may be adjusted. For example, for a certain width of a fracture channel, the degree of solidification is different when it is horizontal or vertical during the printing process. This is because horizontal channels are subject to re-solidification by thermal bleed from solidifying the layers above. Accordingly, the additive manufacturing controller (104) may alter an orientation of a part to be built based on a desired fracture channel strength.

While specific reference is made to a few examples of adjustments that may be made, any number of adjustments may be made to these fracture channels so that they have a reduced fracture toughness as compared to the adjacent portions of the 3D printed object.

Moreover, while reference is made to a single adjustment being used, any number of these adjustments may be used in combination. For example, a width of a fracture channel may be altered as well as increasing the amount of detailing agent in that channel.

Accordingly, the present system (100) provides a way to specify what will occur as a 3D printed object fractures, which specification may be based on any number of criteria including removing sharp corners from the shards and/or providing a deterministic failure site for the 3D printed object.

Figure 2:
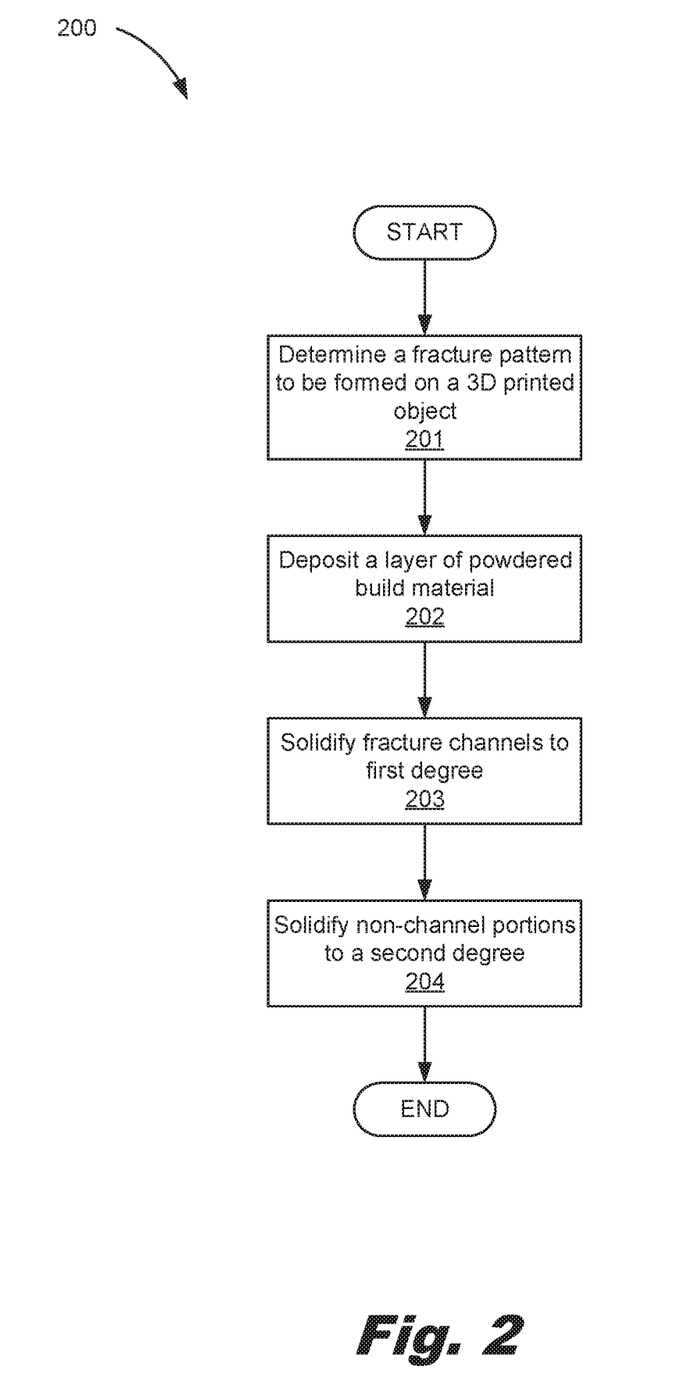
FIG. 2 is a flow chart of a method for forming fracture channels in a 3D printed object, according to an example of the principles described herein.

FIG. 2 is a flow chart of a method (200) for forming embedded fracture channels in a 3D printed object, according to an example of the principles described herein. According to the method (200), a fracture pattern to be formed on the 3D printed object is determined (block 201). This may be based on user input or automatic. That is, a user may manually alter a design file and/or a build file associated with the 3D printed object, for example by drawing the fracture channels across the surface of the 3D printed object. In another example, the fracture channels are determined (block 201) automatically. Determining (block 201) the fracture pattern may include setting the characteristics of the fracture channel and/or the additive manufacturing process to create the fracture channels. For example, detailing and/or fusing agent deposition may be altered, a build orientation of the part may be altered, and/or an emitting energy of the energy source used to fuse the parts may be altered.

In some examples, the fracture patterns are periodic. In other examples, the fracture patterns are irregular. For example, the fracture channels may have certain characteristics predetermined but the actual channels themselves may be random. As a specific example, a user may input certain criteria such as a desired radius of curvature and the fracture pattern controller (FIG. 1, 102) may generate a random, irregular pattern across a surface of the 3D printed object that meets those criteria.

Slices of the 3D printed object may then be formed by, for example, depositing (block 202) a layer of powdered build material, solidifying (block 203) powdered build material along fracture channels to a first degree and solidifying (block 204) powdered build material at non-channel portions of the slice to a second degree, the second degree being less than the first degree. That is, during solidification (block 203) of the non-channel portions of the 3D printed object, the additive manufacturing device may operate with a certain set of solidification parameters. However, during solidification (block 203) of the fracture channel portions of the 3D printed object, the additive manufacturing device may operate with a different set of solidification parameters, which different set may result in solidified material with a reduced strength. Thus, the present method (200) provides a 3D printed object with a pattern of channels across its surface that have reduced strength such that if damage occurs to the 3D printed object such that a crack or other failure occurs, it occurs along the fracture patterns. Thus, the method (200) reduces the uncertainty that may result when a 3D printed object fails. This reduced uncertainty thus provides greater control over the performance of the 3D printed object. In some examples, some of the operations may be performed in a layer-wise fashion. That is, the powdered build material deposited (block 202) and the fracture channels and non-channel portions solidified (block 203, 204) to their respective degrees may be done in a layer-wise fashion, sequentially forming slices of the 3D printed object.

Figure 3:
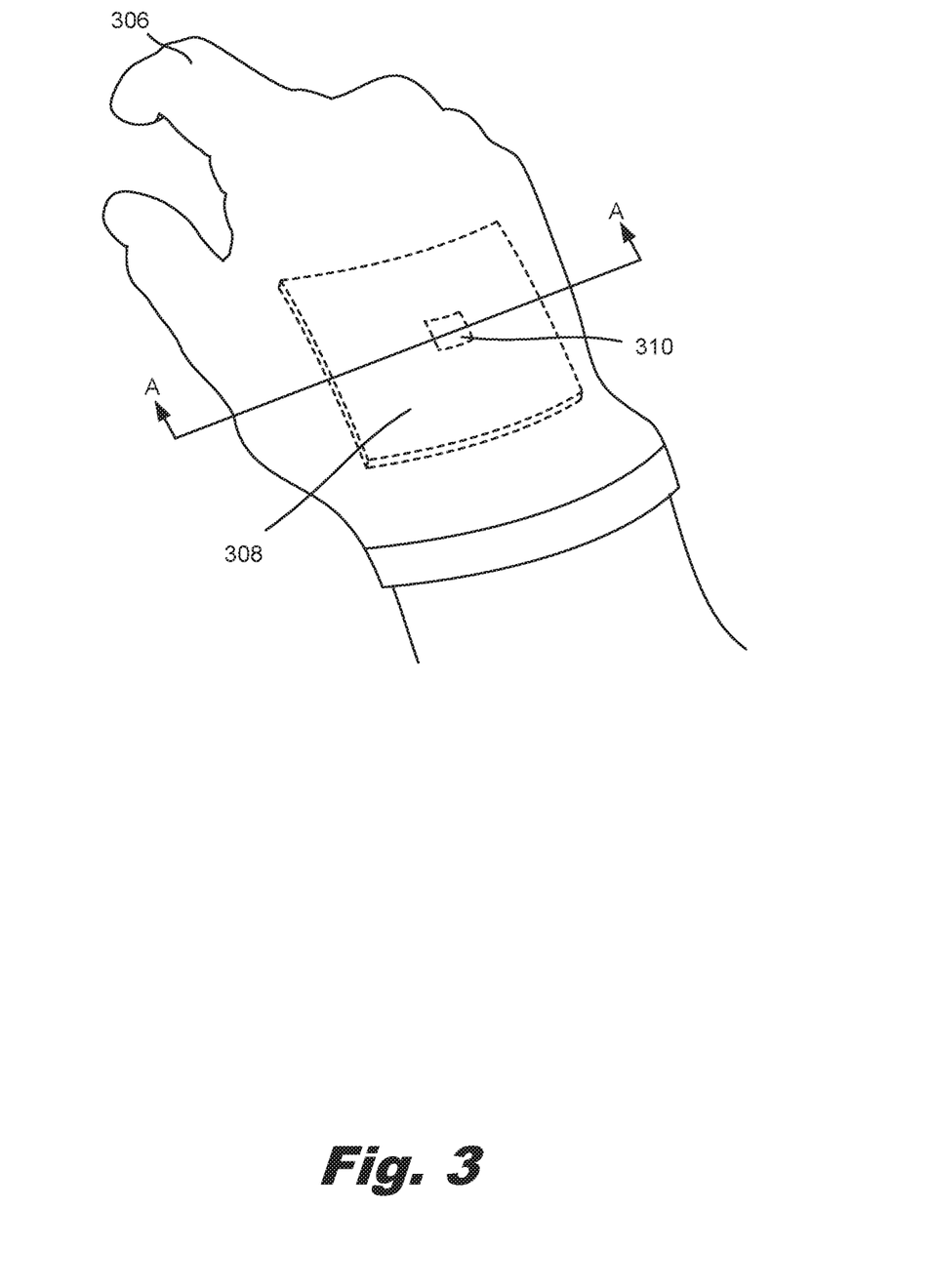
FIG. 3 is an isometric view of a 3D printed object with fracture channels, according to an example of the principles described herein.

FIG. 3 is an isometric view of a 3D printed object (308) with embedded fracture channels, according to an example of the principles described herein. Specifically, FIG. 3 depicts a glove that includes, as a protective surface, a 3D printed object (308). In FIG. 3, the 3D printed object (308) is defined as a plate surface and is depicted in dashed lines to indicate its position internal to the glove (306). While FIG. 3 depicts a specific example of a 3D printed object (308) with particular dimensions and a particular shape, a 3D printed object (308) may take any variety of forms and any variety of shapes.

Figure 4A:
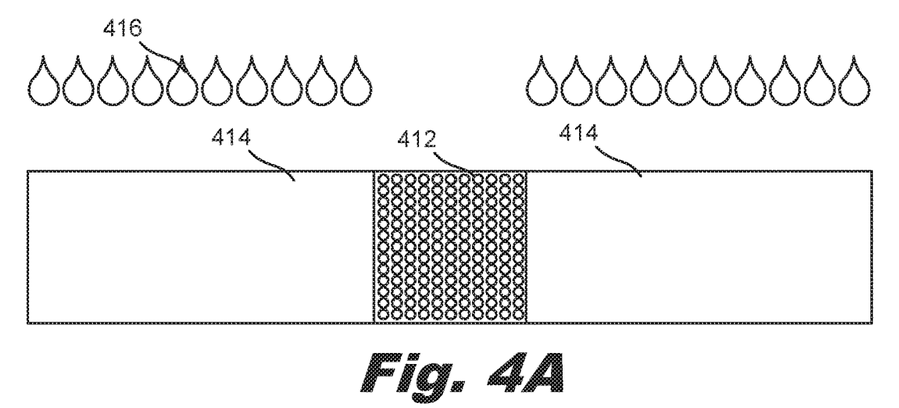
FIGS. 4A-4C depict cross-sections of fracture channels, according to an example of the principles described herein.
Figure 4B:
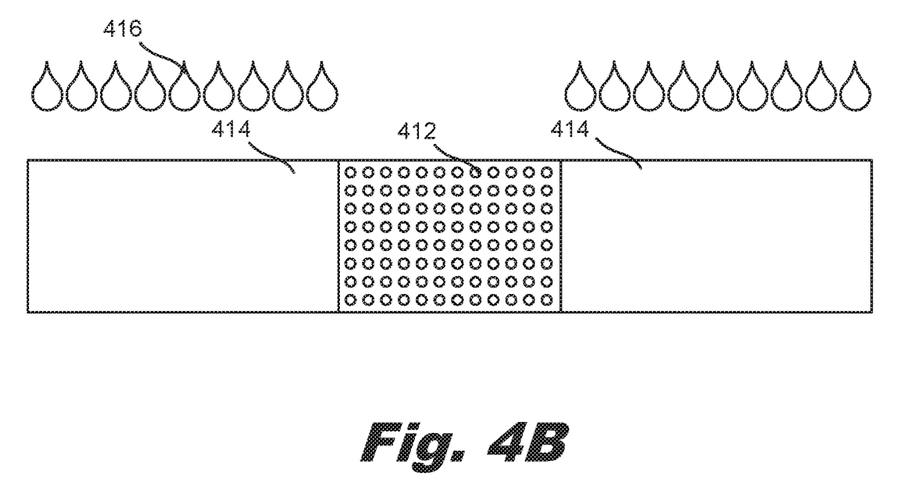
Figure 4C:
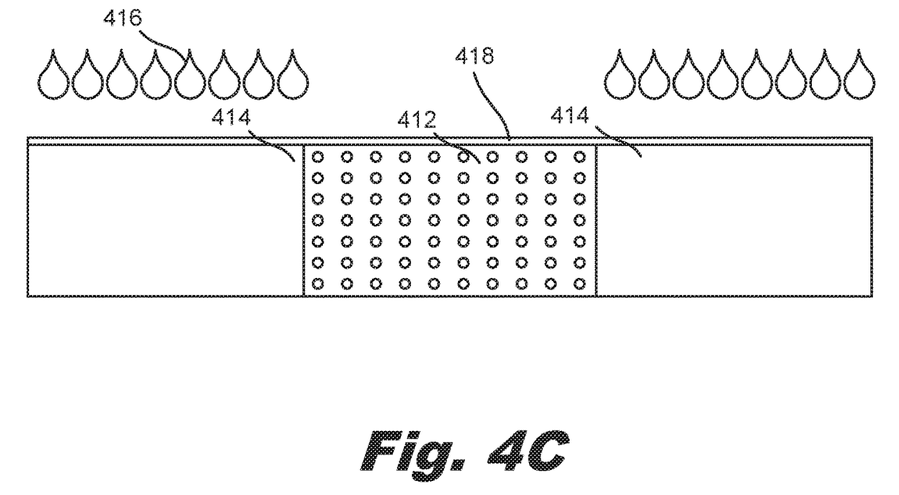

FIGS. 4A-4C depict cross-sections of embedded fracture channels (412), according to an example of the principles described herein. Specifically, FIGS. 4A-4C depict a portion of the cross-sectional view of the 3D printed object (FIG. 3, 308) taken along the line A-A from FIG. 3. As described above, for each layer of the 3D printed object (FIG. 3, 308), non-channel portions (414) may be solidified using different solidifying characteristics as compared with the fracture channels (412) that span the 3D printed object (FIG. 3, 308). In FIGS. 4A-4C, the fracture channels (412) are differentiated from non-channel portions (414) via a dot-fill. In the figures, a spacing of the fill indicates different strengths of the fracture channels (412). As can be seen in FIGS. 4A-4C, different sizes, or widths, of fracture channels may result in different fracture channel (412) strengths. For example, narrower channels may be stronger as indicated by the more densely filled fracture channels (412).

FIGS. 4A-4C depict a particular scenario where thermal bleed is used to generate the fracture channels (412) with different strengths. For example, a fusing agent (416) may be deposited to form the slice of the 3D printed object (FIG. 3, 308) with a gap that defines the path of the fracture channels (412). As an energy source is applied over the slice, the portions that receive the fusing agent (416), that is the non-channel portions (414), absorb thermal energy such that they fuse together. This thermal energy may dissipate to portions of the slice that do not receive the fusing agent, i.e., the fracture channels (412). As described above, this dissipation may cause the fracture channels (412) to partially fuse such that they are bound together. However, these partially-fused fracture channels (412) may break down under a particular stress, which particular stress is less than the stress to break apart the non-channel portions (414).

As the width of the fracture channel (412) increases, the amount of thermal bleed decreases as indicated by the decreasingly dense fill going from FIG. 4A to FIG. 4C. The decrease in thermal bleed reduces the partial fusing, which reduces the strength of the fracture channels (412). Accordingly, in this particular example, a particular strength of the fracture channel (412) may be selected based on the width of the fracture channel (412). As described above, while FIGS. 4A-4C depict one scenario for altering a strength of the fracture channel (412), a variety of other adjustments may also be made.

In some examples, the fracture channels (412) may be exposed to a surface of the 3D printed object (FIG. 3, 308) as depicted in FIGS. 4A and 4B. However, in some examples, the fracture channels (412) may be embedded in interior layers of the 3D printed object as depicted in FIG. 4C. That is, there may be at least one surface layer (418) deposited on top of the fracture channels (412). In this example, the predicable fracturing of the 3D printed object (FIG. 3, 308) still exists, but the fracture channels (412) may not be discernible. Adding surface layers (418) on top of the fracture channels (412) may also provide additional strength to the 3D printed object (FIG. 3, 308).

Figure 5A:
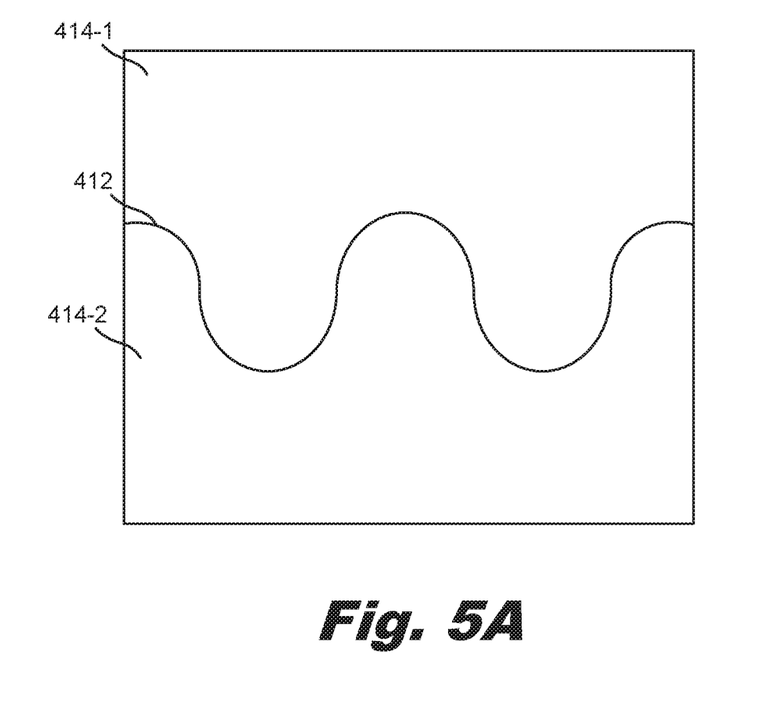
FIGS. 5A and 5B depict a top view of fracture channels, according to an example of the principles described herein.
Figure 5B:
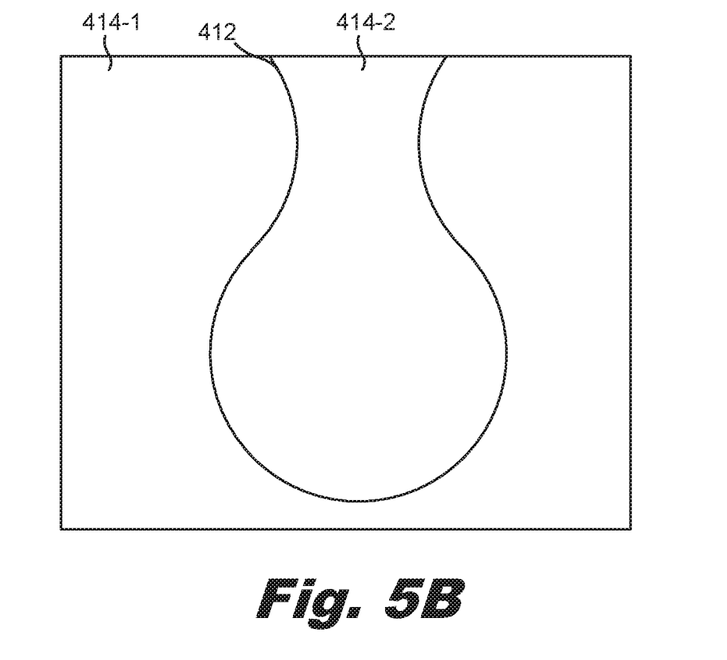

FIGS. 5A and 5B depict a top view of embedded fracture channels (412), according to an example of the principles described herein. Specifically, FIGS. 5A and 5B depict different examples of a portion (FIG. 3, 312) of the 3D printed object (FIG. 3, 308). As described above, the fracture channels (412) may run along a surface of the 3D printed object (FIG. 3, 308) and may separate adjacent non-channel portions (414-1, 414-2). In some examples, the fracture channels (412) are curved channels between non-channel portions (414). These curved fracture channels (412) prevent sharp corners around the non-channel portions (414) of the slice. Accordingly, were the 3D printed object (FIG. 3, 308) to fracture, it would be along these fracture channels (412). As the fracture channel includes curved channels, there would be no resulting sharp corners on the fracture shards, thus preventing additional danger and/or injury to a user. That is, as described above sharp corners pay pose a danger to a user or to other components in which the 3D printed object (FIG. 3, 308) is embedded, and curved fracture channels (412) prevent any negative consequences of sharped-corner fracture shards.

In some examples, the fracture channels (412) may be an interlocking channel between non-channel portions (414). For example, as depicted in FIG. 5B, the geometry of the fracture channel (412) in part keeps the two non-channel portions (414-1, 414-2) together even upon a fracture. In this example, upon fracture, not only are sharp corners prevented, but the 3D printed object (FIG. 3, 308) may avoid breaking apart given the interlocking nature of the fracture channel (412). Such an arrangement provides even greater danger avoidance by reducing the dangerous sharp corners of particular shards, and also keeping the object in a single, or fewer, pieces. By comparison, upon fracture, the adjacent non-channel portions (414-1, 414-2) in FIG. 5A may separate as the fracture channel (412) in this case does not interlock the adjacent non-channel portions (414-1, 414-2).

In these examples, the strength of a particular fracture channel (412) may be selected based on whether it locks or does not lock adjacent non-channel portions (414) together. For example, in FIG. 5A, the mechanism that retains the non-channel portions (414) may be entirely the strength of the fracture channels (412). By comparison, in FIG. 5B, the interlocking geometry as well as the strength of the fracture channels (412) retains the non-channel portions (414) together. As the fracture channels (412) in FIG. 5B are not the mechanism keeping the non-channel portions (414) together, this fracture channel (412) strength may be designed to be less. By comparison, as the fracture channel (412) in FIG. 5A does not lock the non-channel portions (414) together, this fracture channel (412) may be designed to be stronger as compared to the fracture channel (412) depicted in FIG. 5B. As a particular example, the fracture channel (412) in FIG. 5B may be narrower as compared to the fracture channel (412) depicted in FIG. 5A.

Figure 6:
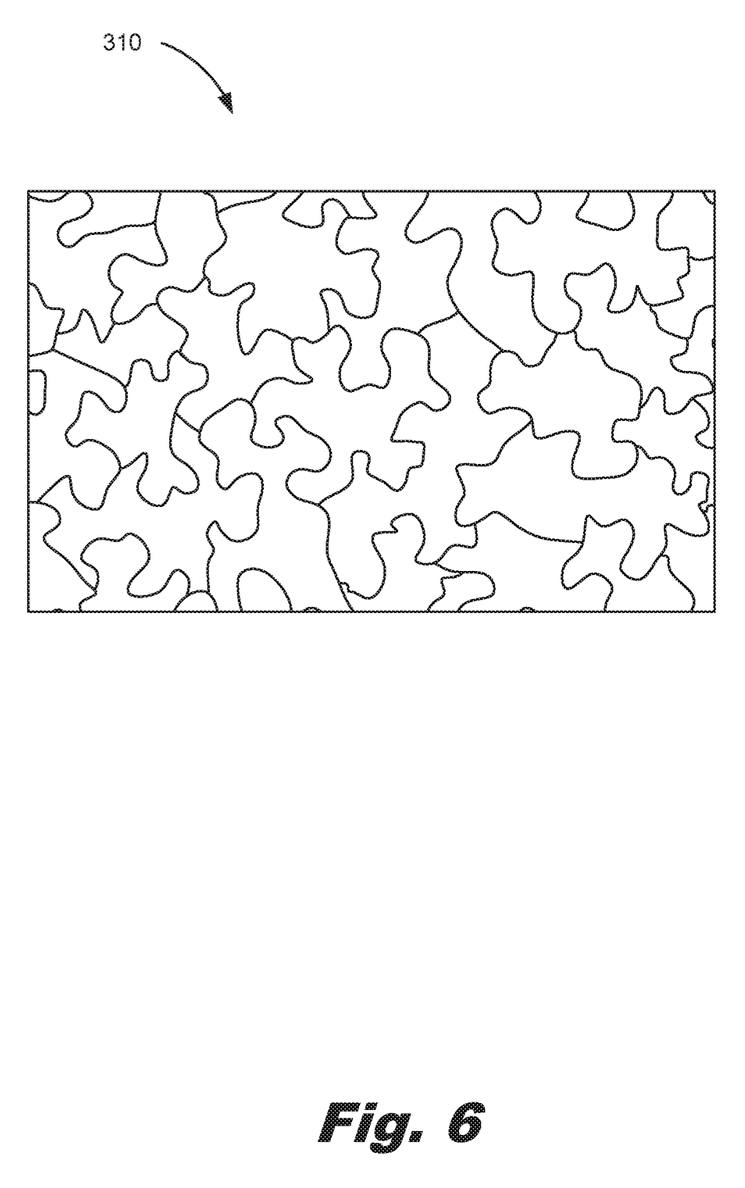
FIG. 6 depicts a top view of a pattern of fracture channels, according to an example of the principles described herein.

FIG. 6 depicts a top view of a pattern of fracture channels (FIG. 4A, 412), according to an example of the principles described herein. Specifically, FIG. 6 depicts a top view of a portion (310) of the 3D printed object (FIG. 3, 308). As depicted in FIG. 6, in some examples, the fracture pattern, that is the pattern of fracture channels (FIG. 4A, 412) across the surface of the 3D printed object (FIG. 3, 308), may be an irregular pattern spanning the 3D printed object (FIG. 3, 308). As can be seen from FIG. 6, upon fracture, sharp shards are largely prevented due to having fracture channels (FIG. 4, 412) that are curved. While FIG. 6 depicts just a portion (310) of the 3D printed object (FIG. 3, 308), this pattern may be repeated across the entire surface of the 3D printed object (FIG. 3, 308).

Figure 7:
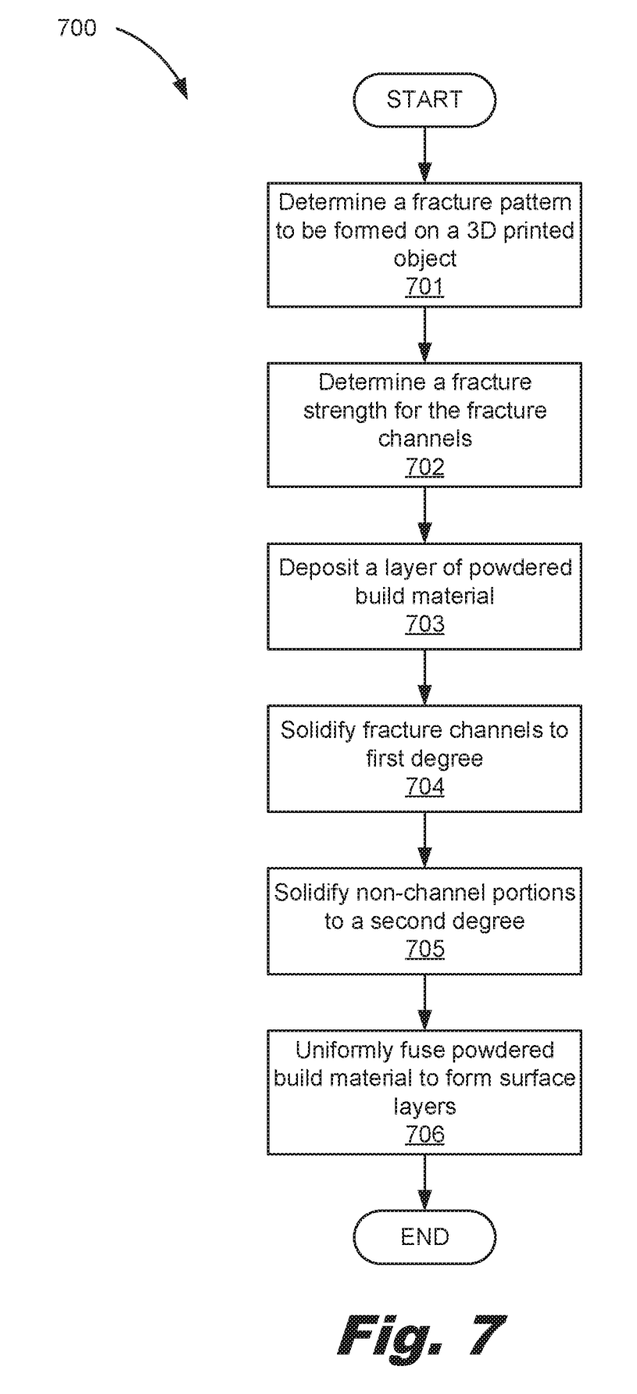
FIG. 7 is a flow chart of a method for forming fracture channels in a 3D printed object, according to another example of the principles described herein.

FIG. 7 is a flow chart of a method (700) for forming embedded fracture channels (FIG. 4, 412) in a 3D printed object (FIG. 3, 308), according to another example of the principles described herein. As described above in connection with FIG. 2, the method (700) includes determining (block 701) a fracture pattern to be formed in the 3D printed object (FIG. 3, 308), the fracture pattern referring to the combination of fracture channels (FIG. 4, 412) that span the 3D printed object (FIG. 3, 308), either on the surface or below the surface layers.

In addition to determining (block 701) the fracture pattern, the system (FIG. 1, 100) and in particular the fracture channel controller (FIG. 1, 102) may determine (block 702) a fracture strength of the fracture channels (FIG. 4, 412). That is, different fracture channels (FIG. 4a, 412) may have different fracture strengths. Put another way, the under-solidified fracture channels (FIG. 4, 412) may have different degrees of solidification at different locations.

In one particular example as described above, the fracture strength for a fracture channel (FIG. 4, 412) may be based on whether the fracture channel (FIG. 4, 412) locks adjacent portions of the slice together. In other examples, the different fracture channel (FIG. 4, 412) strengths may be determined so as to produce fractures at desired locations. For example, on a 3D printed fluid container, it may be desirable that if the 3D printed container is to rupture, it first ruptures near a fluid inlet for ease of repair. It may also be desirable that in the event of a catastrophic failure of the fluid container, no sharp-cornered shards result. Consequently, the fracture strength of fracture channels (FIG. 4, 412) near the fluid inlet have a reduced strength as compared to curved fracture channels (FIG. 4, 412) at other locations.

Once the fracture channels (FIG. 4, 412) are determined (block 701) and strengths for each determined (block 702), the 3D printed object (FIG. 3, 308) may be formed as described above in connection with FIG. 2. That is, a layer of powdered build material may be deposited (block 703) and fracture channels (FIG. 4, 412) solidified (block 704) to a first degree and non-channel portions (FIG. 4, 414) solidified (block 705) to a second degree that is greater than the first degree.

As described above in some examples, the fracture channels (FIG. 4, 412) may be sub-surface. In such an example, the method (700) includes uniformly solidifying (block 706) powdered build material to form surface layers (FIG. 4, 418). These surface layers (FIG. 4, 418) may serve to obscure the fracture channels (FIG. 4, 412) for aesthetic purposes and may also provide added strength to the overall 3D printed object (FIG. 3, 308).

Figure 8:
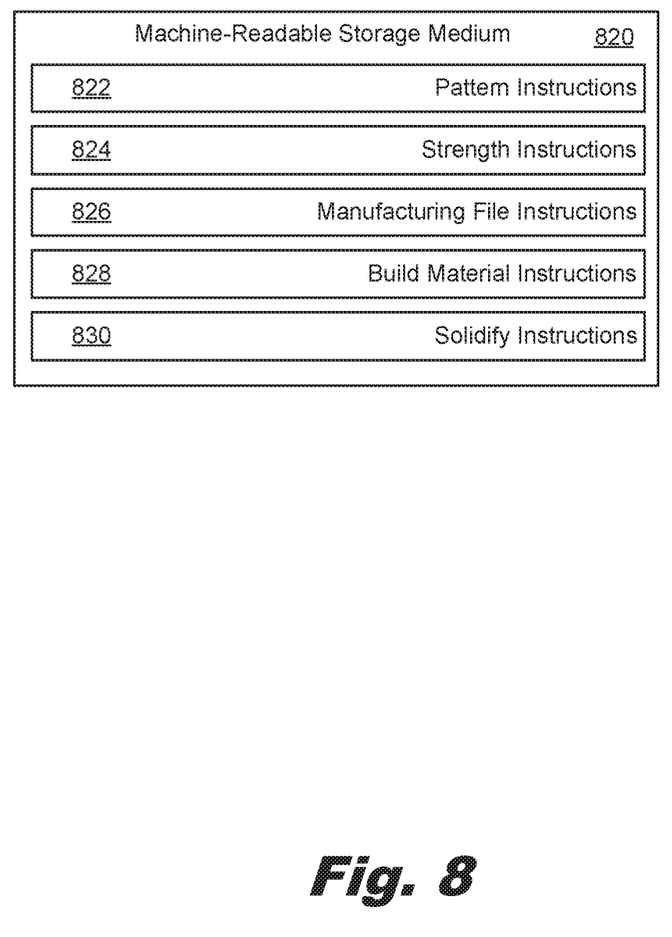
FIG. 8 depicts a non-transitory machine-readable storage medium for forming fracture channels in a 3D printed object, according to an example of the principles described herein.

FIG. 8 depicts a non-transitory machine-readable storage medium (820) for forming embedded fracture channels (FIG. 4, 412) in a 3D printed object (FIG. 3, 308), according to an example of the principles described herein. To achieve its desired functionality, a computing system includes various hardware components. Specifically, a computing system includes a processor and a machine-readable storage medium (820). The machine-readable storage medium (820) is communicatively coupled to the processor. The machine-readable storage medium (820) includes a number of instructions (822, 824, 826, 828, 830) for performing a designated function. The machine-readable storage medium (820) causes the processor to execute the designated function of the instructions (822, 824, 826, 828, 830).

Referring to FIG. 8, pattern instructions (822), when executed by the processor, cause the processor to determine a fracture pattern to be formed on the 3D printed object (FIG. 3, 308). Strength instructions (824), when executed by the processor, may cause the processor to, determine a fracture strength for each fracture channel (FIG. 4, 412). Manufacturing file instructions (826), when executed by the processor, may cause the processor to alter a manufacturing file associated with the 3D printed object (FIG. 3, 308) to incorporate the fracture pattern into the 3D printed object (FIG. 3, 308). Build material instructions (828), when executed by the processor, may cause the processor to deposit a layer of powdered build material. Solidify instructions (830), when executed by the processor, may cause the processor to solidify powdered build material along fracture channels (FIG. 4, 412) of the fracture pattern to a first degree and to solidify powdered build material at non-channel portions (FIG. 4, 414) of the slice to a second degree, the second degree being greater than the first.

Such systems and methods 1) provide for the selection of desired fracture channels such that upon failure, the 3D printed object fails in a predictable way; 2) allow formation of the fracture pattern without a second material; and 3) provides for fracture channels in an effective and simple manner. However, it is contemplated that the systems and methods disclosed herein may address other matters and deficiencies in a number of technical areas.

What is claimed is:

1. An additive manufacturing device, comprising:
a fracture channel controller to determine fracture channels for a three-dimensional (3D) printed object, wherein portions of the 3D printed object along the fracture channels are to be solidified to a lesser degree as compared to non-channel portions of the 3D printed object; and
an additive manufacturing controller to control an additive manufacturing device to:
solidify portions of a layer of a powdered build material to form a slice of the 3D printed object; and
selectively solidify the fracture channels in the slice, wherein the fracture channels are solidified to the lesser degree as compared to the non-channel portions.

2. The additive manufacturing device of claim 1, wherein the fracture channels comprise curved channels between the non-channel portions.

3. The additive manufacturing device of claim 1, wherein the fracture channels comprise interlocking channels between the non-channel portions.

4. The additive manufacturing device of claim 1, wherein the fracture channels are embedded on interior layers of the 3D printed object.

5. The additive manufacturing device of claim 1, wherein, to adjust a degree of solidification of the powdered build material that is to form the fracture channels, the additive manufacturing controller is to perform at least one of:
adjusting a width of the fracture channels;
adjusting a density of a detailing agent in the fracture channels;
adjusting a density of a fusing agent in the fracture channels;
depositing an additional material over the fracture channels;
adjusting an emitting energy of a solidifying device; and
adjusting a build orientation of the 3D printed object.

6. The additive manufacturing device of claim 1, wherein the fracture channel controller is to alter a design file associated with the 3D printed object to define the fracture channels.

7. The additive manufacturing device of claim 1, wherein the fracture channel controller is to alter a build file associated with the 3D printed object to define the fracture channels.

8. A method, comprising:
determining a fracture pattern to be formed on a three-dimensional (3D) printed object;
in a layer-wise fashion, forming slices of the 3D printed object by:
depositing a layer of a powdered build material;
solidifying the powdered build material along fracture channels of the fracture pattern to a first degree; and
solidifying the powdered build material at non-channel portions of the slices to a second degree, the second degree being greater than the first.

9. The method of claim 8, further comprising uniformly solidifying powdered build material to form surface layers of the 3D printed object.

10. The method of claim 8, wherein the fracture pattern is an irregular pattern spanning the 3D printed object.

11. The method of claim 8, further comprising determining a fracture strength of the fracture channels.

12. The method of claim 11, wherein different fracture channels have different fracture strengths.

13. The method of claim 12, wherein a fracture channel strength is based on whether a fracture channel locks adjacent portions of the slices together.

14. A non-transitory machine-readable storage medium encoded with instructions executable by a processor, the non-transitory machine-readable storage medium comprising instructions to:
  determine a fracture pattern to be formed on a three-dimensional (3D) printed object;
  determine a fracture strength for each fracture channel;
  alter a manufacturing file associated with the 3D printed object to incorporate the fracture pattern into the 3D printed object; and
  in a layer-wise fashion, control an additive manufacturing device to form slices of the 3D printed object, the additive manufacturing device controlled to:
    deposit a layer of a powdered build material;
    solidify the powdered build material along fracture channels of the fracture pattern to a first degree; and
    solidify the powdered build material at non-channel portions of the slices to a second degree, the second degree being greater than the first degree.

15. The non-transitory machine-readable storage medium of claim 14, wherein the fracture pattern prevents sharp corners around the non-channel portions of the slices.

16. A method, comprising:
  determining a fracture pattern to be formed on a three-dimensional (3D) printed object;
  in a layer-wise fashion, forming slices of the 3D printed object by:
    depositing a layer of a powdered build material;
    solidifying the powdered build material along fracture channels of the fracture pattern to a first degree; and
    solidifying the powdered build material at non-channel portions of the slices to a second degree, the second degree being greater than the first;
  wherein one or more of the fracture channels comprise an interlocking channel between the non-channel portions.

17. The method of claim 16, further comprising uniformly solidifying powdered build material to form surface layers of the 3D printed object.

18. The method of claim 16, wherein the fracture pattern is an irregular pattern spanning the 3D printed object.

19. The method of claim 16, further comprising determining a fracture strength of the fracture channels.

20. The method of claim 16, wherein a fracture channel strength is based on whether a fracture channel comprises the interlocking channel.

* * * * *